United States Patent

Chen

(10) Patent No.: US 10,112,833 B2
(45) Date of Patent: Oct. 30, 2018

(54) METHOD FOR PREPARING ALUMINUM NITRIDE

(71) Applicant: National Tsing Hua University, Hsinchu (TW)

(72) Inventor: Swe-Kai Chen, Hsinchu (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 2 days.

(21) Appl. No.: 15/429,340

(22) Filed: Feb. 10, 2017

(65) Prior Publication Data

US 2018/0148335 A1    May 31, 2018

(30) Foreign Application Priority Data

Nov. 28, 2016  (TW) .............................. 105139128 A

(51) Int. Cl.
    *C01B 21/072*    (2006.01)
(52) U.S. Cl.
    CPC ................. *C01B 21/0722* (2013.01)
(58) Field of Classification Search
    None
    See application file for complete search history.

(56) References Cited

U.S. PATENT DOCUMENTS

| | | | | |
|---|---|---|---|---|
| 5,126,121 A | * | 6/1992 | Weimer | C01B 21/0722 423/412 |
| 6,159,439 A | * | 12/2000 | Miura | C01B 21/0722 423/412 |
| 2010/0092748 A1 | * | 4/2010 | Boehm | C01B 21/0722 428/220 |

FOREIGN PATENT DOCUMENTS

KR    2003001944 A1 *  1/2003    ............... B22F 9/00

* cited by examiner

*Primary Examiner* — Guinever S Gregorio
(74) *Attorney, Agent, or Firm* — Locke Lord LLP; Tim Tingkang Xia, Esq.

(57) ABSTRACT

A method for producing aluminum nitride is to disclose, which includes injecting a nitrogen-containing gas and a pure aluminum material into a high-temperature jet mill. In the high-temperature jet mill, the injected pure aluminum material reacts with the nitrogen and forms aluminum nitride on the surface. The aluminum nitride is continuously to pulverize in the high-temperature jet mill to form fine aluminum nitride powder. According to the present disclosure, unnecessary cost and complicated processes in elevated-temperature agglomeration is to avoid.

2 Claims, 2 Drawing Sheets

METHOD FOR PREPARING ALUMINUM NITRIDE

CROSS REFERENCE TO RELATED APPLICATION

This application also claims priority to Taiwan Patent Application No. 105139128 filed in the Taiwan Patent Office on Nov. 28, 2016, the entire content of which is incorporated herein by reference.

BACKGROUND OF THE INVENTION

1. Field of the Invention

The disclosure is related to a method for preparing aluminum nitride, and more particularly, to a convenient and efficient method for preparing aluminum nitride.

2. Descriptions of the Related Art

Aluminum nitride has been widely used for electronics in recent years because it has high thermal conductivity, (normally, the thermal conductivity of commercial aluminum nitride is about 170~230 W/m/K, which is close to that of silicon carbide and beryllium oxide, and is 5 to 7 times of aluminum oxide), low dielectric constant and dielectric loss, good electric insulating quality, and low thermal expansion coefficient, which is close to that of silicon ($4.2 \times 10^{-6}$/T) and gallium arsenide ($5.7 \times 10^{-6}$/° C.). Aluminum nitride is also not toxic as beryllium oxide, and it is usually prepared with reduced manufacturing cost. For example, aluminum nitride has its applications in semiconductors and microelectronic packaging substrates, chip carrier substrates of high brightness LED, electronics and lighting devices of automobile, heat dissipating materials of high power electronic device and so forth, and it has great potential to replace other ceramic substrate materials.

General methods to prepare aluminum nitride include gas phase reaction method, organo-metallic precursor method, alumina powder carbon reduction nitriding method, aluminum powder direct nitriding method and combustion synthesis method. The followings describe each the above-mentioned methods and the disadvantages thereof:

(1) Gas phase reaction: the reaction formula is $AlCl_3 + 4NH_3 \rightarrow AlN + 3NH_4Cl$. The reaction temperature is 900 K to 1500 K, the required reaction time is longer than 5 hours, and the product type includes crystalline and amorphous aluminum nitride powder. Generally, the conversion rate of the product is about 80%. The disadvantage is that the production cost is high and the yield remains desired, rendering those methods unsuitable for industrial production.

(2) Organo-metallic precursor method: $R_3Al + NH_3 \rightarrow R_3AlNH_3$, $R_3AlNH_3 \rightarrow R_2AlNH_2 + RH$, $R_2AlNH_2 \rightarrow RAlNH + RH$, $RAlNH \rightarrow AlN + RH$. The operating temperature is 400 K to 1000 K and the reaction time is 10 to 240 minutes. The product is aluminum nitride (AlN) and alkanes, which will decompose and produce carbon deposition during the reaction, so that the product need to place in the air and to heat to remove carbon is necessary. This step may lead to higher oxygen content. In addition, this method is also costly and not productive so that it is not suitable for industrial production either.

(3) Alumina powder carbon reduction nitriding method: $Al_2O_3 + N_2 + 3C \rightarrow 2AlN + 3CO$. The operating temperature is 1500 K to 2200 K and the reaction time is 5 hours or more.

(4) Aluminum Powder Direct Nitriding Method:

(a) $2Al + N_2 \rightarrow 2AlN$, aluminum powder direct nitriding method is to heat aluminum powder in nitrogen, and directly transform aluminum powder into aluminum nitride powder through nitriding reaction; Al and N begin to react at 500° C., and during 500~600° C., the surface oxide film on aluminum particle is removed by forming of volatile sub-oxide by reactions. However, the gradual formed nitride film on the particle surface will hinder further permeation of nitrogen and slow down the nitriding process, such that it needs a secondary nitriding process in order to improve the nitriding efficiency. Specifically, the primary nitriding is to perform at 800° C. for one hour, and then the product goes through a secondary nitriding at 1200° C. after ball-milling process to obtain uniform aluminum nitride powders.

(b) The reaction products of aluminum powder direct nitriding method often require both multiple pulverization and nitriding treatment, therefore the production cycle prolongs and the production cost increases. Moreover, the introduction of impurities during the ball-milling process negatively affects the purity of aluminum nitride powder. Therefore, it is difficult to prepare aluminum nitride powder with high purity and fine grain size by direct nitriding method, which fails to meet the requirement of raw material powder for obtaining qualified aluminum nitride ceramics.

(5) Self-Propagating High-Temperature Synthesis (SHS):

(a) This method is to design reactants of exothermic reactions. The reaction is firstly to initiate an external source of heat, and then it is self-maintaining by the release of heat itself. This method also forms combustion wave that propagates and spreads. Combustion synthesis method (or high-temperature self-propagating method) is a new type of inorganic refractory material preparation technology that occurred in the Soviet Union during 1960s. Because of its advantages of short synthesis time and low energy consumption in refractory material synthesis, it is increasingly capturing much attention from materials academia.

(b) This method has been used domestically and abroad to study the synthesis of aluminum nitride powder. Aluminum powder is to ignite by external heat under high pressure, the reaction between Al and N generates high chemical reaction heat that sustains the reaction itself until Al powder is complete convert to AlN. Preparing aluminum nitride powder through self-propagating high-temperature synthesis method is substantially using direct nitriding aluminum, as indicated by the reaction formula of $2Al + N_2 \rightarrow 2AlN$. The aluminum nitride powder prepared by this method, however, does not need to be exposed to 1000° C. for a long time of nitriding as in the direct nitriding method. It does not require any external heat source except for igniting, and therefore less energy is to consume, which may result in lowered cost and higher production efficiency.

(c) In SHS process using the Al—$N_2$ system, since the melting point of aluminum is low, as in the direct nitriding method, the molten aluminum tends to agglomerate at the high temperature of the combustion synthesis reaction, which hinders nitrogen from penetrating into the powder and makes it difficult for aluminum powder to be completely nitrided.

(d) Therefore, the general disadvantages of the combustion synthesis method are:

(d1) The conversion rate is not high enough.

(d2) It is not easy to have mass production. That is, during mass production, the conversion rate will decline.

(d3) The product is in the state of melting agglomerate or sintering, which makes it hard to be grinded. In other words, grinding the product prepared using the conventional methods above is time-consuming and energy consuming. Wearing off grinding balls also causes increase in the impurity content in powders, which problem shares all of the existing combustion synthesis methods. There are studies showing that adding a certain amount of aluminum nitride as diluents to aluminum powder can prevent molten aluminum from agglomeration and can improve the permeability of nitrogen. Even so, however, this approach will complicate the process and increase the cost.

As described above, the conventional combustion synthesis method has the problem of melting agglomeration. In order to solve this problem, it is necessary to carry out ball grinding for multiple times, which in turn at the same time would introduce more impurities. The present disclosure discloses pulverizing aluminum nitride produced in high reaction temperature through a high-temperature jet-mill. Thus, reaction and pulverizing aluminum nitride layer can happen at the same time. After pulverizing aluminum nitride layer, it is possible to solve the problem that nitrogen cannot penetrate into the powder so that aluminum powder cannot be complete nitride.

SUMMARY OF THE INVENTION

The present disclosure relates to a method for preparing aluminum nitride, which can solve the problem of ball grinding because of aluminum melting agglomeration. Thus, aluminum does not stop reacting with nitrogen because of aluminum melting agglomeration, so that unnecessary cost and complex processes for solving the problem of high temperature melting agglomeration is to avoid.

In one embodiment of the present disclosure, a method for preparing aluminum nitride includes:

Injecting a nitrogen-containing gas and a pure aluminum material into a high-temperature jet mill, Allowing for the injected pure aluminum material to be reacting with the nitrogen and forming aluminum nitride on the surface in the high-temperature jet mill, and Making the aluminum nitride pulverize continuously and form fine aluminum nitride powder in the high-temperature jet mill.

More specifically, the injected pure aluminum material is powder-shaped or particle-shaped.

More specifically, the nitrogen-containing gas and the pure aluminum material are to inject into the high-temperature jet mill by a high-pressure air, and a high-speed airflow is to form inside the high-temperature jet mill. Thus, aluminum nitride formed on the surface of the pure aluminum material by the reaction collides in the high-temperature jet mill because the high-speed airflow is to pulverize aluminum nitride powders.

More specifically, the pure aluminum material reacts with the nitrogen and forms aluminum nitride on the surface of the aluminum nitride, after pulverizing the aluminum nitride on the surface. Since liquid aluminum material without reacting with nitrogen exists, such liquid aluminum material continuously reacts with nitrogen and forms aluminum nitride on the surface, which is to pulverize continuously until all the liquid aluminum material is completely to consume.

More specifically, the nitrogen-containing gas further contains argon or other noble gases.

DETAILED DESCRIPTION OF THE PREFERRED EMBODIMENTS

The technical solutions, features and effects of the disclosure is to clearly describe in the description of embodiments referring to the figures below.

Figure 1:
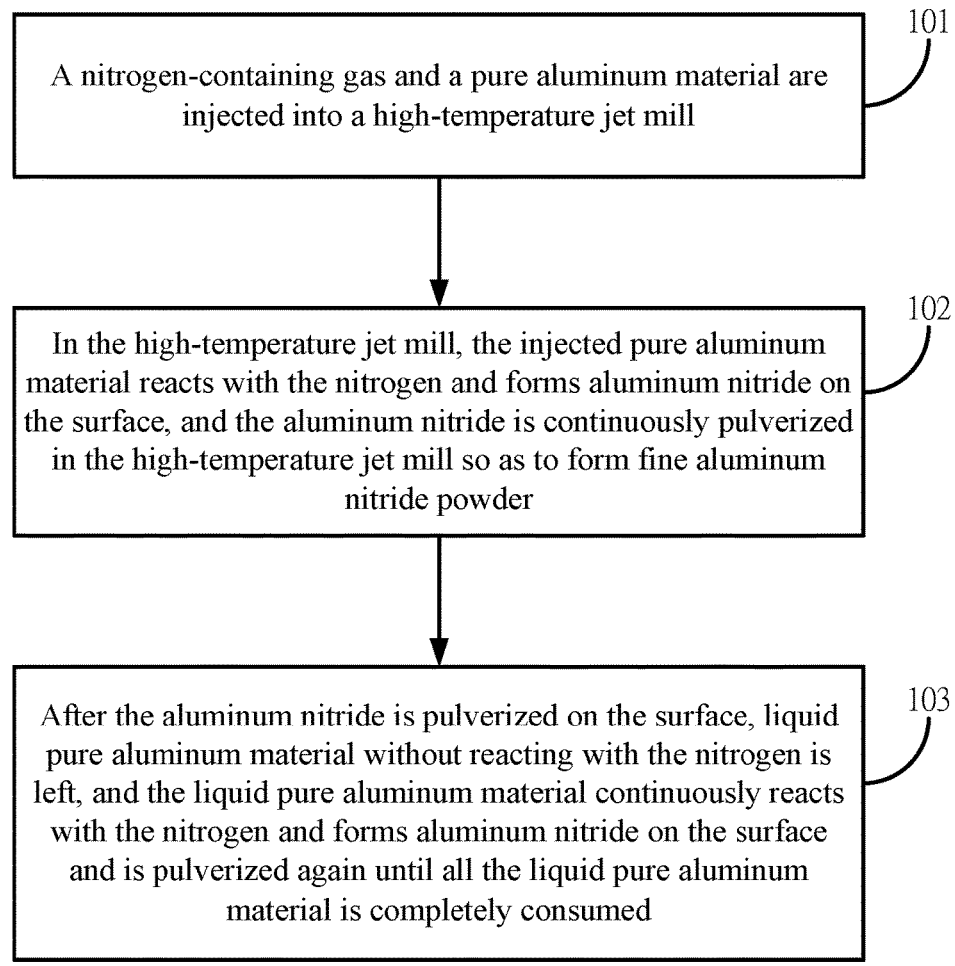
FIG. 1 is a flow chart of the method for producing aluminum nitride according to one embodiment of the present disclosure.

As shown in FIG. 1, the preparing method according to one embodiment of the present disclosure is as the followings:

(1) Nitrogen-containing gas and a pure aluminum material are to inject into a high-temperature jet mill (step 101).

(2) In the high-temperature jet mill, the injected pure aluminum material reacts with the nitrogen and forms aluminum nitride on the surface, and the aluminum nitride is continuously pulverized in the high-temperature jet mill so as to form fine aluminum nitride powder (step 102);

(3) After removing the aluminum nitride on the surface, remained liquid aluminum material without reacting with nitrogen continuously reacts with the nitrogen and forms aluminum nitride on the surface again and, as with step 102, is to pulverize again. Thus, it is continuously to react and to pulverize until all the liquid pure aluminum material is completely to consume (step 103).

Figure 2:
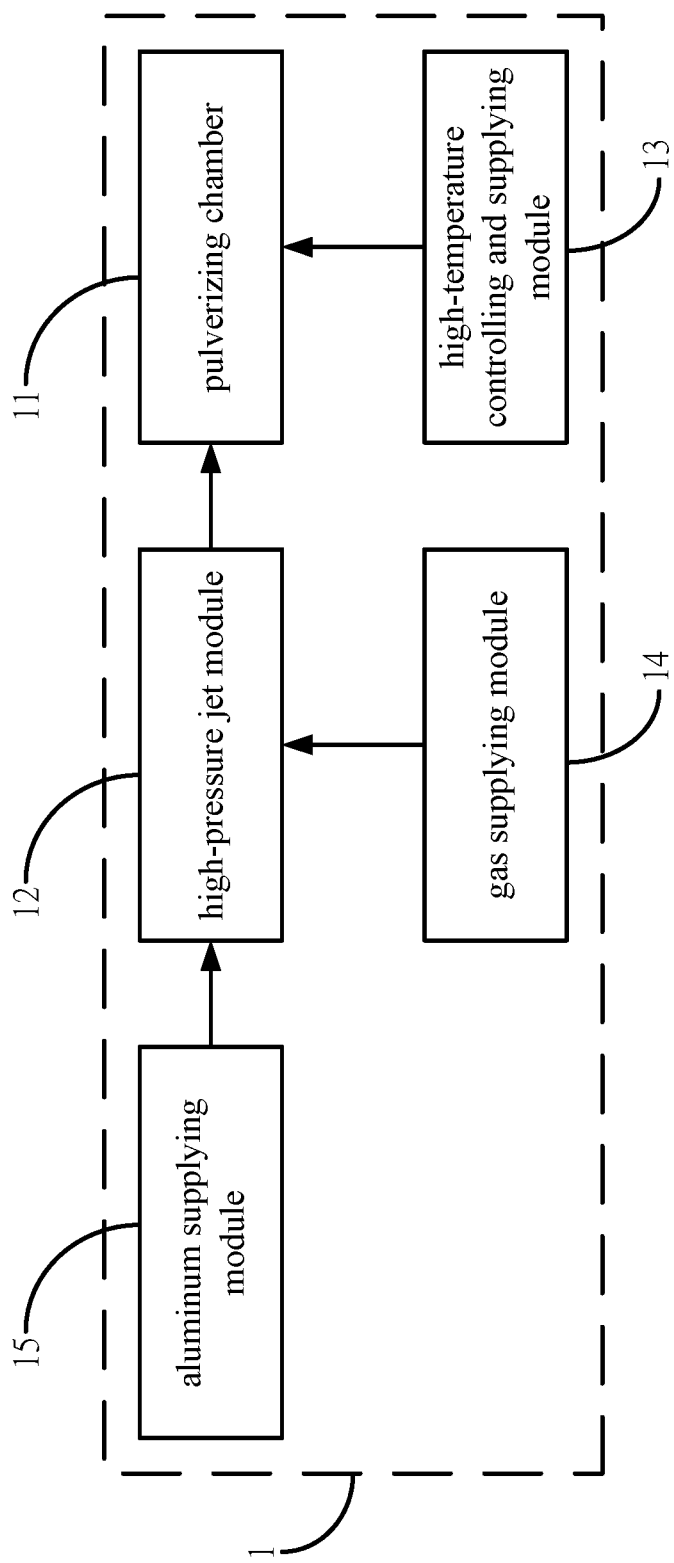
FIG. 2 is a schematic diagram of the high-temperature jet mill according to one embodiment of the present disclosure.

FIG. 2 shows the high-temperature jet mill 1 of the disclosure. The jet mill may include the following five modules. They are at least one pulverizing chamber 11 operating in vacuum, a high-pressure jet module 12 connected with the pulverizing chamber 11, a high-temperature controlling and supplying module 13 connected with the pulverizing chamber 11, a gas supplying module 14 connected with the high-pressure jet module 12, and an aluminum supplying module 15 connected with the high-pressure jet module 12. The gas-supplying module 14 is capable of supplying nitrogen, argon or some other noble gases, and the aluminum-supplying module 15 is to configure for importing powder-shaped or particle-shaped pure aluminum.

The high-pressure jet module 12 is capable of injecting the nitrogen-containing gas provided by the gas supplying module 14 into the pulverizing chamber 11 by a high-pressure gas, and a high-speed airflow is formed inside the pulverizing chamber 11. The high-temperature controlling and supplying module 13 is capable of controlling the temperature inside the pulverizing chamber 11 to be within the range of 660~2200° C., such that the temperature in the pulverizing chamber 11 is higher than the melting point of pure aluminum material and is lower than the melting point of aluminum nitride. When the pure aluminum material enters the pulverizing chamber 11, since the temperature is higher than the melting point of the pure aluminum material, the pure aluminum melts into liquid phase), and pure aluminum material generally begins to react with nitrogen at 500° C., and during 500~600° C., the surface oxide films of aluminum particles are removed because of the forming of volatile sub-oxides. The higher temperature in the pulverizing chamber 11 may correspond to faster rate of the forming of the aluminum nitride. Therefore, in one embodiment of the present disclosure, the reaction is performed between 660~2200° C.

In addition, since the standard heat of formation ($\Delta H°_{298}$) of aluminum is −318 kJ/mol, such that the compound (aluminum nitride) is to form only when the ambient of the pulverizing chamber 11 can reach −318 kJ/mol, allowing for the reaction of $2Al_{(l)}+N_{2(g)} \rightarrow 2AlN_{(s)}$. As compared to conventional aluminum powder direct nitriding method, the differences are that the pulverizing chamber 11 of the disclosure can replace the ball-milling treatment in conventional methods. Since the reaction temperature in conventional aluminum powder direct nitriding method is 726.85° C.~1226.85° C., and conventional aluminum powder direct nitriding method can be rapidly completed under 1550° C. However, in order to increase the conversion rate and prevent powder agglomeration (fusion), the reaction in the conventional aluminum powder direct nitriding method can be realized under a lower temperature (<1227° C.), which may still result in the problem of fusion. For such problem to be resolved, multiple ball milling could be required.

In the present disclosure, the pulverizing chamber 11 can replace conventional ball-milling treatments, such that ball milling does not need. In addition, even if the temperature of the pulverizing chamber 11 is controlled to be higher than 1227° C., aluminum nitride can still be pulverized, so that the liquid pure aluminum material can react with the nitrogen and form aluminum nitride on the surface and be pulverized again until all the liquid pure aluminum material is completely consumed. Thus, the present disclosure allows for the application of a higher reaction temperature, which could accelerate the forming of the aluminum nitride, provided that the reaction temperature of the pulverizing chamber 11 cannot be higher than 2200° C., at which point the formed aluminum nitride powder will be melted.

According to the present disclosure, the high-temperature jet mill 1 is identical to conventional airflow pulverizers, and the only difference is that a module for high-temperature supplying and controlling is to add. The devices that could realize the high-temperature and high-speed airflow inside while the raw material is pulverized for that materials to be colliding with each other falls within the scope which the disclosure seeks to protect.

According to the method for preparing aluminum nitride of the present disclosure, as compared with other conventional techniques, there are advantages as the followings:

1. According to the present disclosure, the aluminum nitride formed under high temperature is to pulverize, such that the aluminum nitride layer is to pulverize during the reaction, which can solve the problem that nitrogen cannot permeate into the powder and aluminum powder cannot be completely nitrided.

2. According to the present disclosure, unnecessary cost and complex processes for solving the problem of high temperature melting agglomeration is to avoid. Therefore, the method disclosed according to the present disclosure is a different from its conventional counterparts.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A method for preparing aluminum nitride, consisting of steps of:
   (a) injecting a nitrogen-containing gas and a pure aluminum material into a pulverizing chamber operating in vacuum in a high-temperature jet mill by a high-pressure air to form a high-speed airflow;
   (b) melting the pure aluminum material into a liquid status of the pure aluminum in the pulverizing chamber in the high-temperature jet mill;
   (c) allowing the liquid status of the pure aluminum material to react with the nitrogen and form aluminum nitride on the surface of the pure aluminum material in the pulverizing chamber in the high-temperature jet mill;
   (d) pulverizing the formed aluminum nitride into aluminum nitride powder and removing the aluminum nitride powder from the surface of the pure aluminum material by the high-speed airflow in the pulverizing chamber in the high-temperature jet mill;
   (e) exposing the remaining liquid status of the pure aluminum material to the nitrogen-containing gas in the pulverizing chamber in the high-temperature jet mill; and
   (f) repeating steps (c) to (e) in the pulverizing chamber in the high-temperature jet mill until all the liquid status of the pure aluminum material is completely consumed.

2. The method for producing aluminum nitride according to claim 1, wherein the nitrogen-containing gas further contains argon or other noble gases.

* * * * *